US006659762B2

(12) United States Patent

Borders et al.

(10) Patent No.: US 6,659,762 B2

(45) Date of Patent: Dec. 9, 2003

(54) OXYGEN-FUEL BURNER WITH ADJUSTABLE FLAME CHARACTERISTICS

(75) Inventors: Harley A. Borders, Lombard, IL (US); Mahendra L. Joshi, Darien, IL (US); Eric Streicher, Downers Grove, IL (US); Thierry Legiret, Toussus le Noble (FR)

(73) Assignees: L'Air Liquide - Societe Anonyme a' Directoire et Conseil de Surveillance pour l'Etude et l'Exploitation des Procedes Georges Claude, Paris (FR); American Air Liquide, Fremont, CA (US)

( * ) Notice: Subject to any disclaimer, the term of this patent is extended or adjusted under 35 U.S.C. 154(b) by 148 days.

(21) Appl. No.: 09/956,370

(22) Filed: Sep. 17, 2001

(65) Prior Publication Data

US 2003/0054301 A1 Mar. 20, 2003

(51) Int. Cl.[7] ............................ F23M 3/02; F23M 3/04

(52) U.S. Cl. ............................ 431/8; 431/10; 431/351

(58) Field of Search ................................ 431/8, 10, 11, 431/164, 166, 247, 351; 126/116 R

(56) References Cited

U.S. PATENT DOCUMENTS

| | | | | |
|---|---|---|---|---|
| 5,007,823 A | | 4/1991 | Mayotte et al. | |
| 5,199,866 A | | 4/1993 | Joshi et al. | |
| 5,299,929 A | | 4/1994 | Yap | |
| 5,360,171 A | | 11/1994 | Yap | |
| 5,431,559 A | * | 7/1995 | Taylor | 431/164 |
| 5,449,286 A | | 9/1995 | Snyder et al. | |
| 5,490,775 A | | 2/1996 | Joshi et al. | |
| 5,545,031 A | | 8/1996 | Joshi et al. | |
| 5,575,637 A | | 11/1996 | Slavejkov et al. | |
| 5,611,682 A | * | 3/1997 | Slavejkov et al. | 431/8 |
| 5,630,713 A | * | 5/1997 | Shver et al. | 431/189 |
| 6,074,197 A | * | 6/2000 | Philippe | 431/10 |
| 6,126,438 A | * | 10/2000 | Joshi et al. | 431/161 |
| 6,331,107 B1 | * | 12/2001 | Philippe | 431/285 |

* cited by examiner

*Primary Examiner*—Alfred Basichas

(74) *Attorney, Agent, or Firm*—Linda K. Russell

(57) ABSTRACT

An oxy-fuel burner generates a long, luminous, stable and adjustable flame temperature profile flame by incorporating separate, fuel and oxygen jets oriented in a unique geometry. In one preferred embodiment, the fuel is injected horizontally at medium injection velocity (50–200 m/s) while primary oxygen is injected underneath the fuel jet at supersonic velocity (300–500 m/s). The supersonic velocity oxygen jet (20 to 50% required for stoichiometric combustion) entrains fuel and furnaces gases in it's core for the primary flame development over the furnace load. The subsequent mixing of the fuel, primary oxygen and entrained furnace gases establish a low NOx, stable, long and luminous primary flame. The secondary oxidant, preferably air or low purity oxygen (50 to 80% of stoichiometric needs), is injected above the flame using one or more oxygen jets to create an oxy-fuel flame with adjustable flame characteristics. The secondary oxidant completes unfinished combustion of flame gases containing CO, $H_2$, $CH_4$, soot and HC. The horizontal injection angle for all jets allow delayed mixing and a much longer flame. Due to the massive furnace gas entrainment process, the resulting flame provides adjustability in flame temperature profile as well as lower NOx formation. By changing the fuel, primary oxygen, and secondary oxidant injection velocities, the relative proportion of primary and secondary oxidants, and the relative positions of injectors, a fully adjustable flame is developed.

26 Claims, 7 Drawing Sheets

OXYGEN-FUEL BURNER WITH ADJUSTABLE FLAME CHARACTERISTICS

FIELD OF THE INVENTION

The invention relates to a burner for a furnace, and more particularly, the invention relates to an oxygen-fuel fired burner with adjustable flame characteristics for a high temperature furnace, such as a float glass furnace.

BACKGROUND OF THE INVENTION

Increasing demands for flat glass (produced in float glass furnaces) all over the world is expected to become the major driving force for improved burner technology for float glass furnaces. The float glass industry is expected to see pressure to reduce emissions levels particularly in some geographic areas where new emission standards are being set. One way to improve efficiency of furnaces is to switch from air-fuel fired burners to oxygen-fuel (oxy-fuel) fired burners. The reduced NOx and particulate emissions demonstrated in the container and fiber glass industries after incorporating oxy-fuel technology, along with the improved glass quality and fuel savings are attractive to the float glass industry. However, there are significant difficulties in incorporating oxy-fuel technology into float furnaces.

Typical float furnaces are side-fired, air-fuel fired regenerative types with five to eight ports per side. FIG. 1 shows a typical float glass furnace with six ports per side. Due to the large dimensions of the float glass tank, only cross firing is possible. FIG. 1 shows a float glass furnace 10 with six ports 12 having two burners each along one side of the furnace chamber 14 and one regenerator chamber 16 assigned for each port. The regenerator chambers 16 are used for preheating combustion air to 2200–2400° F. A 20 to 30 minute cyclic process for heat recovery is applied using exhaust gases. The air-fuel burners 20 are installed on each port 12 with 2 to 3 burners per port. The burners 20 are fired under port, through port, or using side of port firing configuration.

The flame length is probably the most important consideration in the operation of a side-fired regenerative furnace 10. It is crucial that the flame be low momentum, luminous, and long with maximum coverage to produce uniform heating of the glass surface. A flame which is too long will destroy the basic checkers by exposing them to reducing conditions. Also excessive fire in the checkers can overheat the refractory causing excessive stagging and plugging within the checker passages. Alternatively, a flame which is excessively short will be very hot resulting in refractory overheating in the vicinity of the burner. Possible refractory slag and drip can contribute to defects in the glass. The short flame also leads to localize overheating of the furnace crown and overheating of the glass surface. The crown overheating reduces the furnace life or campaign due to premature refractory failure and the glass overheating can cause reboil or generate a foam layer that leads to a poor heat transfer to the glass later in the furnace and a generally poor quality glass.

Oxy-fuel burners have been used for many years in the glass industry in general especially in the fiberglass, TV glass, and container glass industry segments. Until recently, the float glass industry has avoided oxy-fuel fired burners due to cost reasons. However, oxygen firing in float glass furnaces is common for oxygen boosting. For example, small amounts of oxygen may be delivered from one or more oxygen boost burners 22 in a float glass furnace 10, as shown in FIG. 1, for global enrichment. Oxygen boost is helpful when furnace regenerators are plugged (unable to supply sufficient combustion air) or limited to boost production.

There are few complete oxy-fuel fired float furnaces in the operation today and they have been using retrofit oxy-fuel burners designed specifically for smaller container or fiberglass furnaces. These conversions were most likely made to meet emissions standards.

Known oxy-fuel burners are predominately nozzle mix designs and avoid premixing for safety reasons due to the increased reactivity of using oxygen as the oxidant versus air. Some common designs of nozzle mix oxy-fuel burners are described in U.S. Pat. Nos. 5,199,866; 5,490,775; and 5,449,286. The concept of nozzle mix oxy-fuel burners is to mix fuel and oxygen at the burner nozzle. These burners can include single or multiple nozzles for fuel and/or oxygen. The flame produced is a diffusion flame with the flame characteristics determined by mixing rates. Short intense flames are most common with these burners, however some delayed mixing geometry are considered to generate longer luminous flames.

Another more recent burner type used in the glass industry for melting applications is the "flat flame" burner. These are multi-orifice burners with various geometries that can produce a flame that is 2 to 3 times wider than a traditional (cylindrical) oxy-fuel flame. U.S. Pat. Nos. 5,545,031; 5,360,171; 5,299,929; and 5,575,637 show examples of flat flame burners.

Most commercial oxy-fuel burners are unsuitable for use in float glass applications because of the shorter overall flame length and lack of air firing ability. It would be desirable to provide the emissions benefits of an oxy-fuel fired burner with a long, luminous, stable flame needed for float glass furnaces. It would also be desirable to provide an oxy-fuel fired burner for a float glass furnace with an adjustable flame temperature profile.

SUMMERY OF THE INVENTION

The present invention relates to an oxy-fuel burner with a long, luminous, stable flame suitable for use in a float glass furnace.

In accordance with one aspect of the present invention, an oxy-fuel burner for producing a long, luminous flame includes a fuel conduit having a nozzle end, a primary oxidant conduit having a nozzle end positioned below the fuel conduit, and a secondary oxidant conduit having a nozzle end positioned above the fuel conduit. A primary oxidant delivery system delivers the primary oxidant to the primary oxidant conduit at a pressure which causes the primary oxidant to exit the primary oxidant nozzle end at a supersonic velocity. A secondary oxidant delivery system delivers the secondary oxidant to the secondary oxidant conduit at a pressure which causes the secondary oxidant to exit the second oxidant nozzle end at less than a supersonic velocity.

In accordance with an additional aspect of the present invention, an oxy-fuel burner for producing a long, luminous flame includes a fuel conduit having a nozzle end, a primary oxidant conduit having a nozzle end positioned below the fuel conduit, and a secondary oxidant conduit having a nozzle end positioned above the fuel conduit. A fuel delivery system delivers the fuel to the fuel conduit at a pressure which causes the fuel to exit the fuel nozzle end at a first velocity. A primary oxidant delivery system delivers the primary oxidant to the primary oxidant conduit at a pressure which causes the primary oxidant to exit the primary oxidant nozzle end at a second velocity. A secondary oxidant delivery system delivers the secondary oxidant to the secondary oxidant conduit at a pressure which causes the secondary oxidant to exit the second oxidant nozzle end at a third velocity. The second velocity is greater than the first and third velocities.

In accordance with a further aspect of the invention, a method of generating a flame suitable for float glass furnaces includes the steps of injecting a fuel through a centrally located nozzle in a refractory burner block, injecting a primary oxidant at supersonic velocity below the fuel, and injecting a secondary oxidant above the fuel nozzle at a lower velocity than the primary oxidant.

BRIEF DESCRIPTION OF THE DRAWING FIGURES

The invention will now be described in greater detail with reference to the preferred embodiments illustrated in the accompanying drawings, in which like elements bear like reference numerals, and wherein.

DETAILED DESCRIPTION OF THE INVENTION

Figure 1:
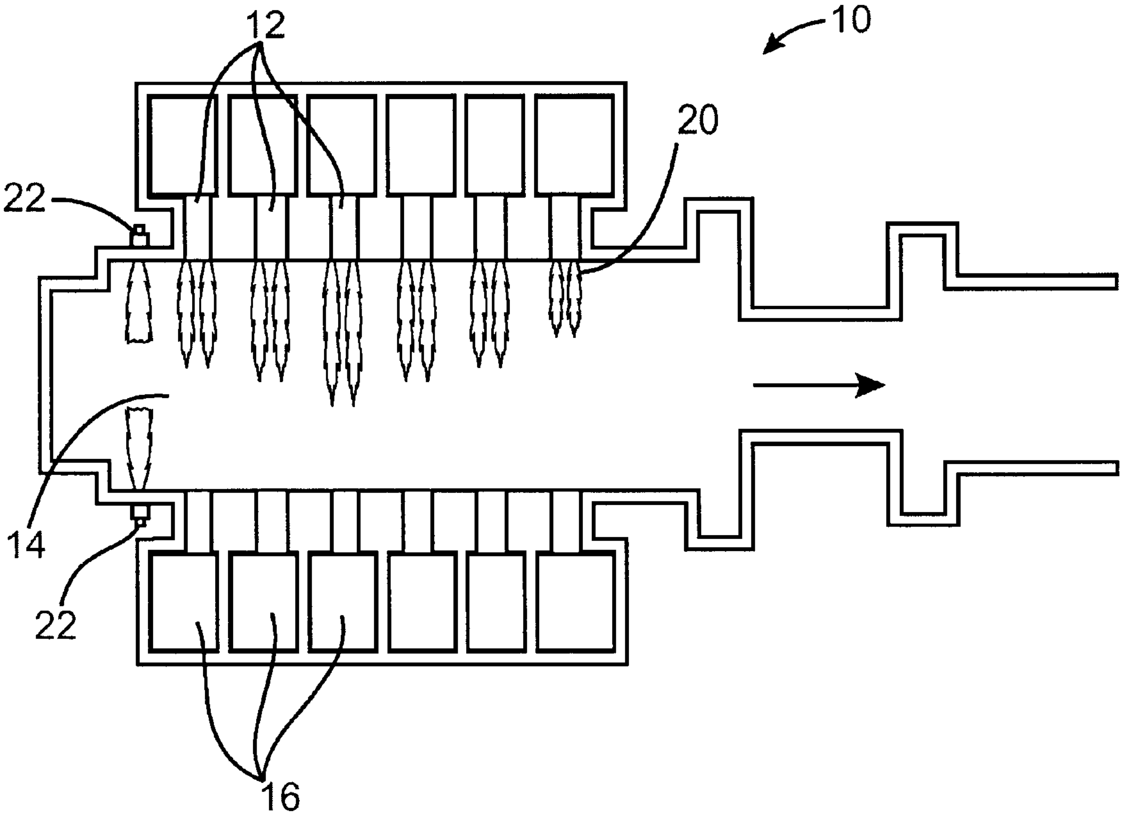
FIG. 1 is a schematic top view of an air-fuel fired float glass furnace according to the prior art.
Figure 2:
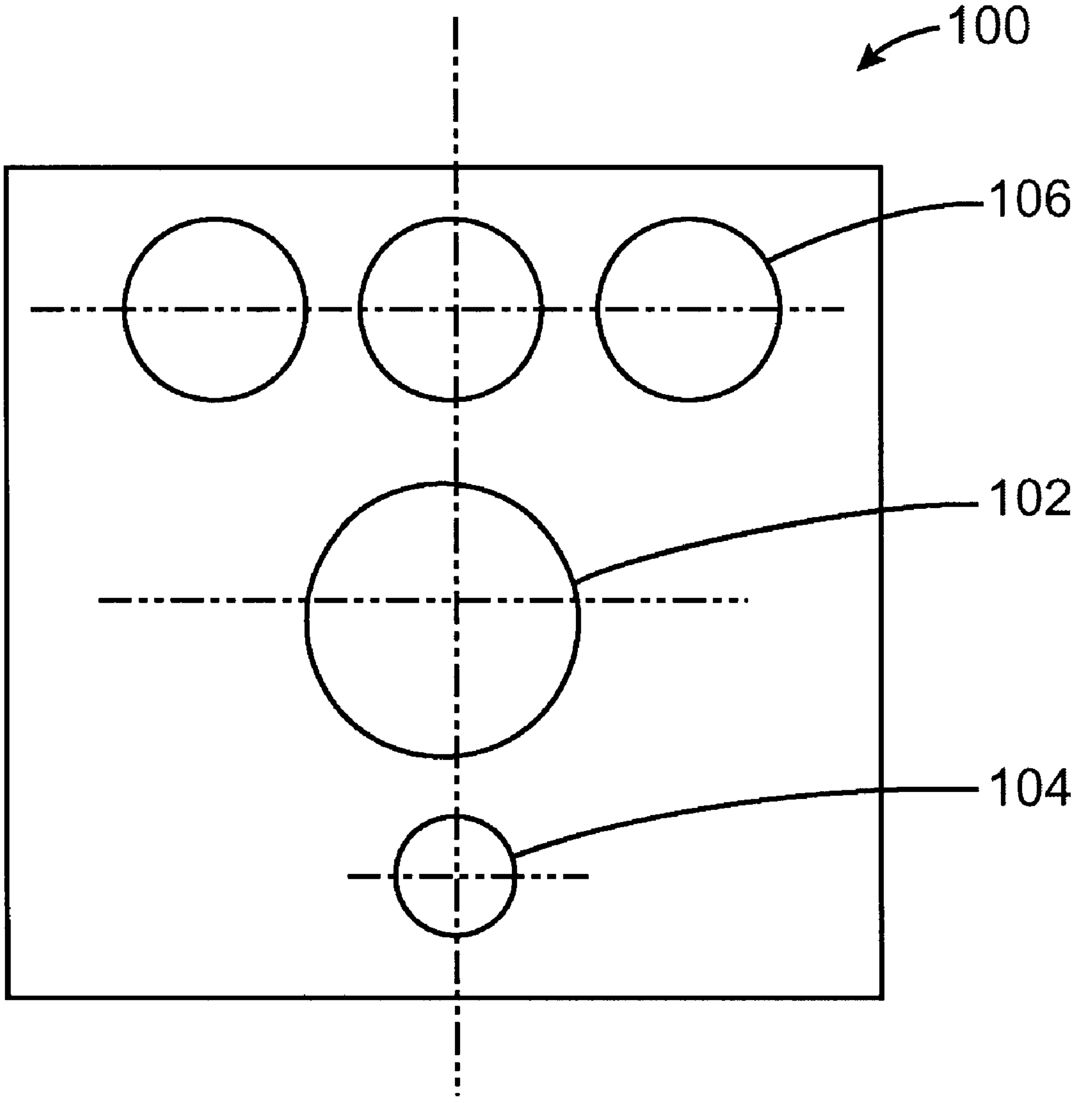
FIG. 2 is a schematic front view of the oxy-fuel burner according to the present invention.

An oxy-fuel burner 100 according to the present invention is illustrated in FIG. 2. The oxy-fuel burner 100 includes separate jets for injection of fuel, primary oxygen, and secondary oxidant (preferably air). As shown in FIG. 2, the oxy-fuel burner 100 includes a fuel nozzle 102, a primary oxygen nozzle 104 positioned below the fuel nozzle, and one or more secondary oxidant nozzles 106 positioned above the fuel nozzle. Massive entrainment of furnace gas is performed using supersonic velocities for the primary oxygen jet as it exits the burner block from the nozzle 104 under the fuel nozzle 102. Remaining combustion is completed using the secondary oxidant jet(s), preferably air or low-purity oxygen, above the primary flame. The burner 100 produces a stable and luminous flame having a variable temperature profile and length. Flame lengths of 20 to 30 feet can be obtained by the burner 100.

The supersonic speed of the primary oxidant jet creates massive entrainment of furnace gas in the axial direction of the flame. This entrainment of furnace gases provides dilution of the flame gases reducing the flame temperature and increasing the flame length. The sub-stoichiometric combustion between the primary oxygen jet and fuel jet create a very low temperature flame diluted with furnace gases and containing soot particles resulting from thermal cracking of excess fuel.

Figure 3:
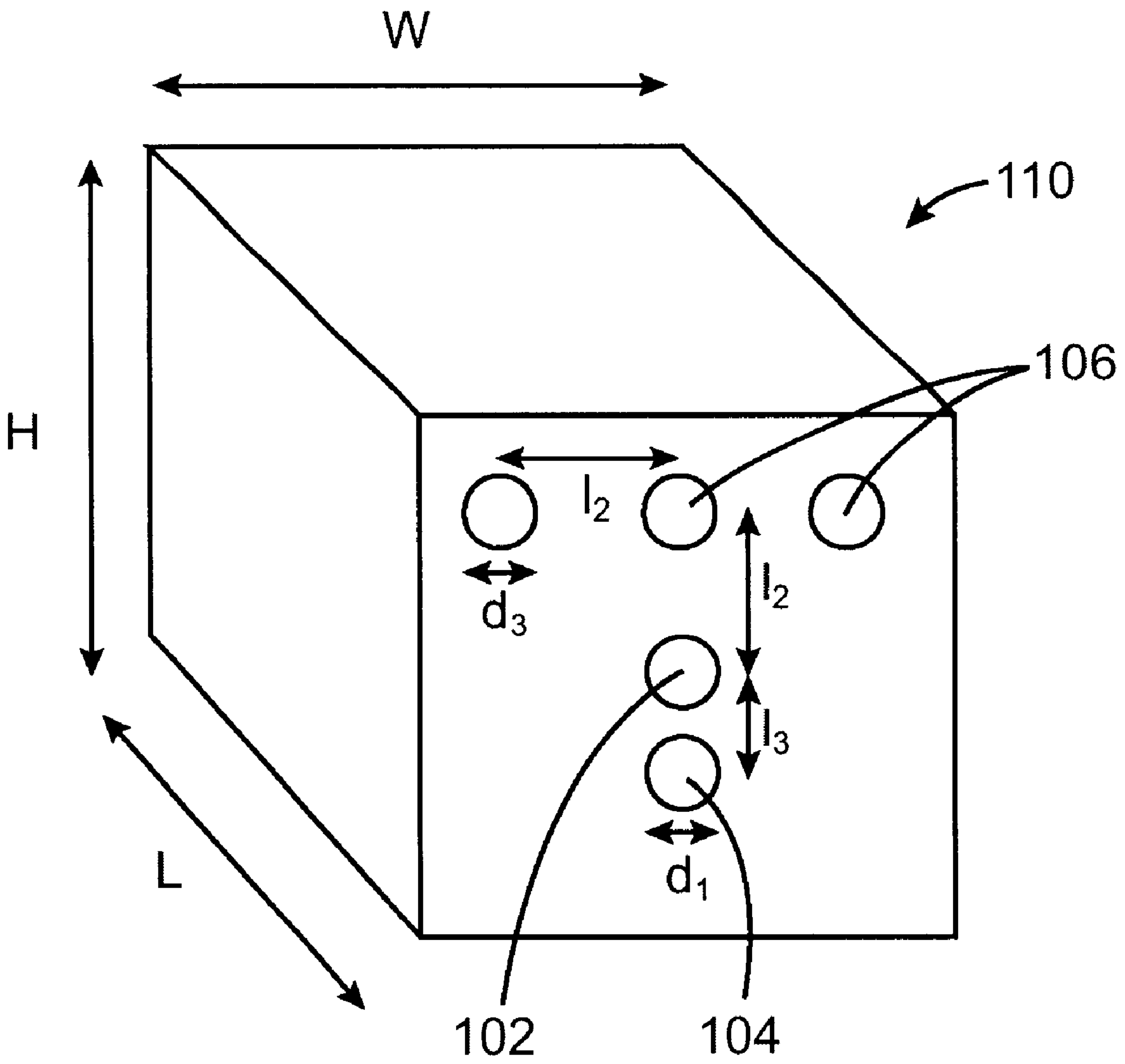
FIG. 3 is a schematic perspective view of the oxy-fuel burner block according to the present invention.
Figure 4:
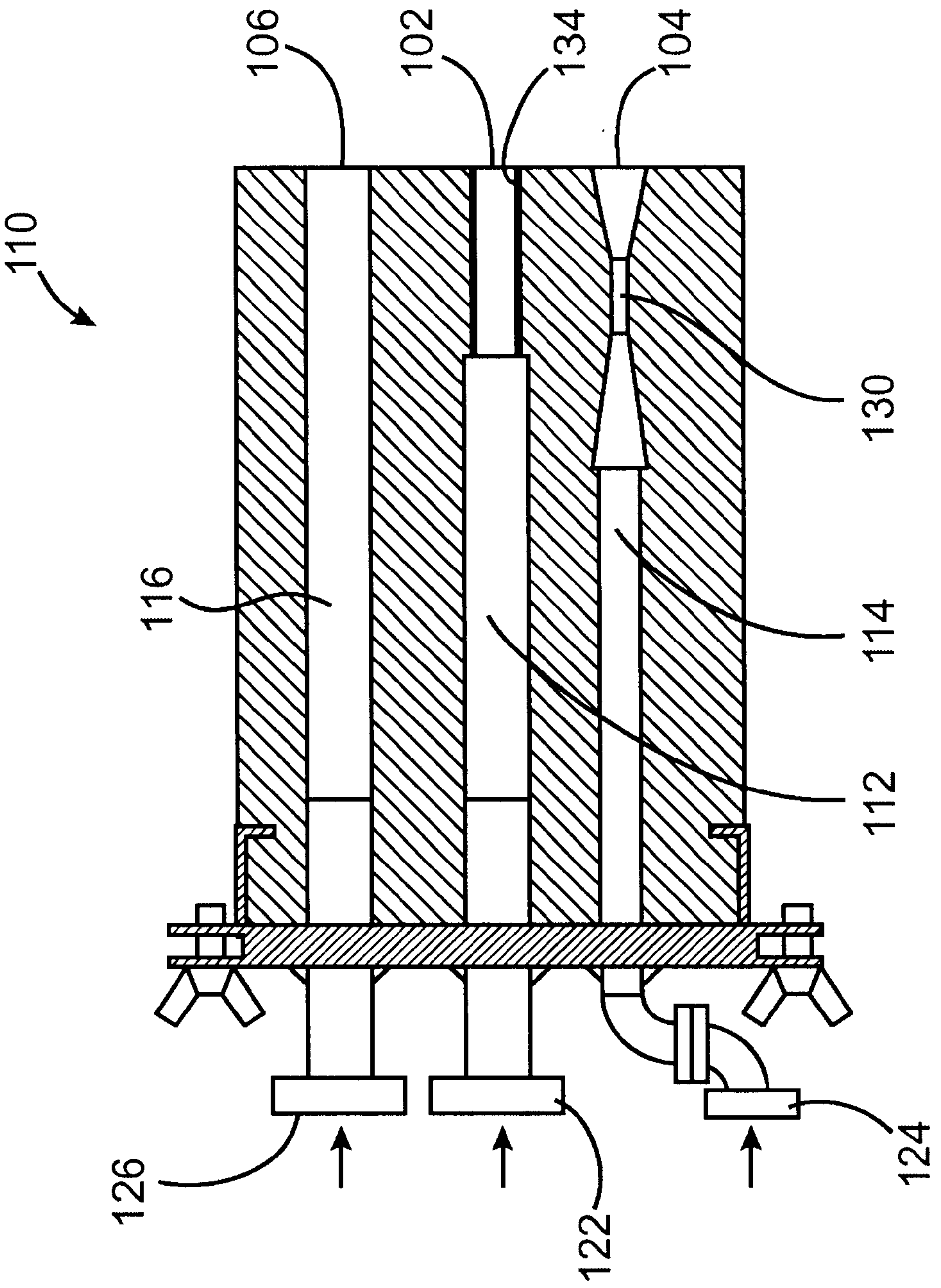
FIG. 4 is a side cross sectional view of the oxy-fuel burner block of the present invention.

As shown in FIGS. 3 and 4, the oxy-fuel burner 100 includes a single horizontal fuel nozzle 102 located in substantially the center of a refractory burner block 110 with the horizontal primary oxygen nozzle 104 preferably supplying about 50% or less of the required oxidant for combustion located directly below the fuel nozzle. The balance of the oxidant (preferably air) required for combustion is supplied through one or more horizontal secondary oxidant nozzles 106 located above the fuel nozzle 102. To be able to control the mixing rates of fuel and oxidants the velocities of the fuel and oxidants can be varied. By changing the fuel, primary oxygen, and secondary oxidant injection velocities, the relative proportion of primary and secondary oxidants, and the relative positions of injectors, a fully adjustable flame is developed.

The oxy-fuel burner configuration of FIGS. 2–4, which will be described in greater detail below provides the advantages of an oxy-fuel burner for use in float glass furnaces where a long, luminous, and stable flame is needed. Conventional oxy-fuel burner technology either "pipe in pipe" or the new generation of flat flame burners can not satisfactorily replace the existing air-fuel burners for a float glass furnace. The pipe in pipe type burners at the typical 4 MW firing rates found in float glass furnace applications generally produce a short high temperature intense flame. This is due to the geometry of the nozzles (some having swirl, multiple holes, multiple slots, etc.) and intense mixing of fuel and oxygen streams in the axial direction. The nozzle mix geometry of these pipe-in-pipe oxy-burners can cause severe or localized overheating of the furnace refractory and the glass surface in a float glass furnace.

On the other hand, the flat flame oxy-fuel burners while generating a wider flame do not have sufficient flame length to deliver heat into the large width of a float glass furnace. In addition, the flat flame burners do not have adjustability features (flame length control) to allow the flame characteristics to be altered depending on the furnace size, changes in pull rate, reducing emissions, and providing the most important characteristics that is flame temperature control along the flame length. In addition, most flat flame oxy-fuel burners are designed for oxygen gas having a purity of 90% and greater. In contrast, the oxy-fuel burner of the present invention can use air as the secondary oxidant providing up to about 80 percent of the required oxygen, thus reducing the overall operating cost of melting without compromising performance.

The solution provided by the present invention is to delay the mixing of the fuel and oxidant, diluting the fuel and oxidant using massive flue gas entrainment, and using secondary oxidant (air or low purity oxygen) to complete combustion with extremely long and low NOx flame. The new oxy-fuel burner 100 also provides sufficient momentum to have the combustion reactants penetrate deep inside the furnace width. The delayed mixing and furnace gas entrainment is achieved with the oxy-fuel burner 100 which has a separate fuel nozzle 102, a supersonic oxygen nozzle 104 for massive furnace gas entrainment and supplies a secondary oxidant nozzle 106 (preferably air or low purity oxygen) for the staged combustion process. By including high velocity and low velocity gas jets in the appropriate configurations to induce entrainment of furnace gases, an adjustable temperature profile flame can be generated.

FIGS. 3 and 4 illustrate a burner block 110 containing the oxy-fuel burner according to the present invention. The entire burner block 110 preferably fits within an about 12-inch square frontal area.

The preferred dimensions for the burner 100 will be described with respect to FIG. 3 for a 4 MW oxy-fuel burner with a 15 MM Btu/hr nominal firing rate, however, these dimensions may be varied depending on the fuel and oxidants used, the fuel and oxidant velocities, and the flame characteristics desired. The overall dimensions including the weight of the burner block should be sufficiently small to allow easy installation. The fuel nozzle 102 has a diameter $d_2$ of about 0.50" to about 2.00", preferably about 1.25". The primary oxidant nozzle 104 has a diameter $d_1$ of about 0.25" to about 1.50", preferably about 0.50". The secondary oxidant nozzle(s) 106 has a diameter $d_3$ of about 1.00" to about 3.00", preferably about 1.50". The nozzle diameters are merely examples and will vary depending on supply gas pressure and selected velocities. A distance $1_3$ between the fuel nozzle 102 and the primary oxygen nozzle 104 is about 1" to about 4", preferably about 1.5". A distance $1_2$ between the fuel nozzle 102 and the secondary oxidant jet 106 is about 1" to about 6", preferably about 4". A distance $1_1$ between the secondary oxidant nozzles 106 is about 1" to about 6", preferably about 4". The secondary oxidant may be distributed in any proportion between the available nozzles. For example, the secondary oxidant may be evenly distributed between the three nozzles, or 50% in the center nozzle and 25% in each of the side nozzles.

The burner block 110 is composed of refractory material which is known for use in float glass production, such as an alumina zirconia stabilized refractory material, or other high zirconia content material. The burner block 110 according to the present invention may have dimensions of about 9" to about 24" in length L, about 12" to about 16" in height H, and about 12" to about 16" in width W. Preferably, the burner block 110 has dimensions of about 12"×12"×12".

The fuel for use in the present invention may be any of the normally gaseous fuels including, but not limited to, methane, natural gas, propane, hydrogen sulfide, and the like, as well as liquid fuels, such as fuel oils, heating oils, waste oils, slurries, and the like. The "primary oxidant" for use in the present invention is any gaseous oxidizer having at least 30% oxygen, and preferably 50%–99.99% oxygen. The "secondary oxidant" for use in the present invention is any gaseous oxidizer having at least 10% oxygen, and preferably less than about 50% oxygen, such as air or oxygen enriched air.

The primary oxidant is injected at supersonic velocity, preferably about 300 m/s or greater, and more preferably about 300 m/s to about 500 m/s. The secondary oxidant (preferably air) is injected at a subsonic velocity, preferably about 30 m/s to about 100 m/s, and more preferably about 20 m/s to about 50 m/s. The typical fuel velocity is in the subsonic range, preferably about 50 m/s to about 200 m/s.

The fuel and oxidant streams can be at ambient temperature or preheated using flue gas heat recovery. The preheat level for either oxidant stream (primary or secondary) can be from about 300° F. to about 3000° F. while the preheat temperature for natural gas is limited to about ambient to about 800° F. Preheat temperatures for other fuels are limited to known acceptable temperatures.

The oxy-fuel burner 100 of the present invention allows the replacement of existing air-fuel burners in float glass applications with oxy-fuel burners while still retaining the positive features of the air burner system. The principle feature of an air flame worth retaining is the large flame area with lengths between 20 to 40 feet. The second feature worth retaining is the uniform flame temperature profile (along the flame length) as compared to current oxy-fuel burner flames. The other attractive feature for regenerative furnaces includes efficient heat recovery of flue energy by preheating the combustion air. The disadvantages of the regenerative air-fuel flame are the high NOx emissions generated primarily due use of air (nitrogen content) and relatively higher temperature combustion due to the temperature of preheated air. In addition, high particulate carryover (due to large flue volume) resulting from high combustion gas velocities is also undesirable.

As shown in FIG. 4, the oxy-fuel burner block 110 includes a fuel conduit 112 having a fuel input end 122 and a nozzle end 102. A nozzle insert 134 at the nozzle end, such as a stabilized zirconia or silicon carbide insert, extends about 6 inches from the nozzle end. The nozzle insert 134 is replaceable and allows adjustment of the fuel stream velocity at the burner outlet. A primary oxygen conduit 114 has a oxygen input end 124 with a oxygen distribution manifold with high temperature flange connections including a calibrating orifice to distribute oxygen flow and a nozzle end 104. The nozzle end is provided with a converging-diverging nozzle passage 130 of a standard configuration having a converging portion, a constant diameter throat portion, and a diverging portion. The secondary oxidant conduit(s) 116 has an oxidant input end 126 with an oxygen distribution manifold and calibrated orifice to distribute oxygen flow and a nozzle end 106.

In the case of fuel oil firing, a single fuel oil atomizer (not shown) is inserted in the fuel conduit 112 inside the burner block. The primary oxygen and secondary oxidant injection scheme for fuel oil firing remain unchanged or similar to fuel gas firing as described in the above paragraphs. The atomization of fuel oil can be performed using mechanical atomization or fluid assist atomization. The atomizing media can be air, oxygen, steam, carbon dioxide, or fuel gas (such as natural gas, propane, etc.). The pressure required for atomizing media is in the range of about 1 bar to about 5 bars and their volume consumption is about 1 scfm/gph of fuel oil used.

Figure 6:
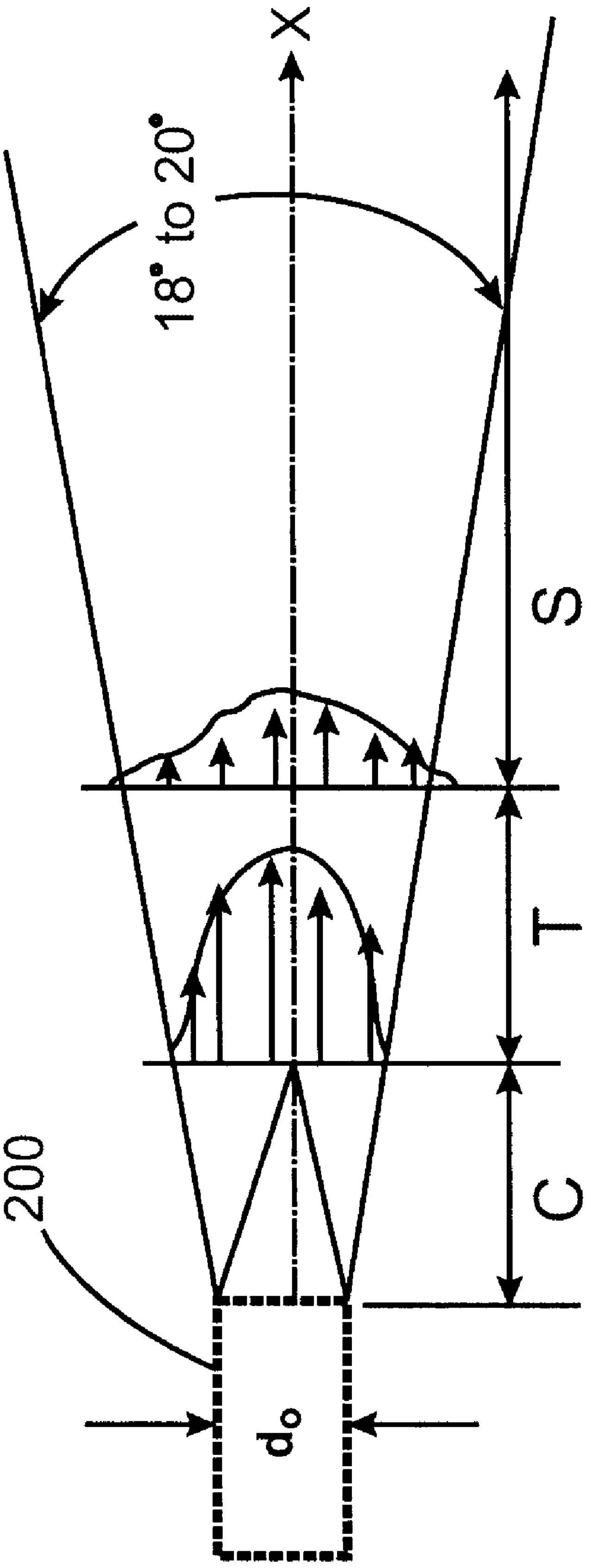
FIG. 6 is an illustration of the flame characteristics of a turbulent free jet.

In order to demonstrate the effectiveness of the present invention, the fundamental characteristics of a turbulent free jet exiting from a nozzle 200 are shown in FIG. 6. Immediately downstream from the nozzle 200 there is the potential core C, within which the mass, velocity, and concentration of nozzle fluid remain unchanged. The potential core C extends to about 4 times the exit diameter of the nozzle $d_o$. Downstream of the potential core C in a transition core T, a free boundary layer develops in which mass, momentum, and concentration are transferred perpendicular to the direction of flow. The transition zone C extends to about 8 times the exit diameter of the nozzle $d_o$. The last zone is described as the similarity zone S (or fully developed region). In the similarity zones, the velocity profiles in all cross sections perpendicular to the main flow direction can be described by the same function as can the distributions of concentration and temperature.

Figure 7:
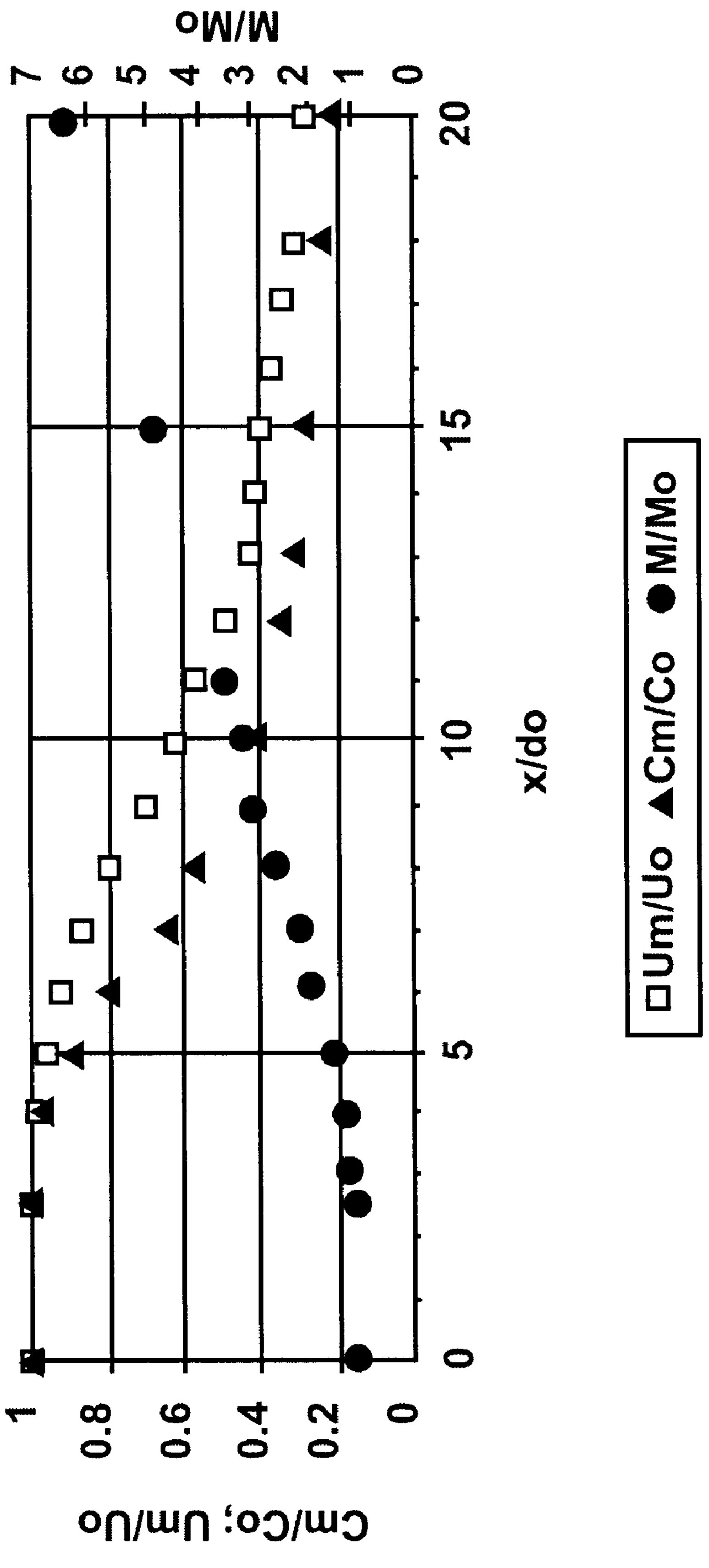
FIG. 7 is a graph showing the normalized jet mass of a turbulent free jet.

FIG. 7 shows that the normalized jet mass (M/Mo) increases as a function of a distance away from the nozzle 200. The normalized jet mass increases by about 5 times at a distance 15 times the exit diameter of the nozzle $d_o$. This increase in mass in the axial direction moving away from the nozzle is due to entrainment of surrounding gas. In the oxy-fuel burner of the present invention, it is furnace gases ($CO_2$, $H_2O$, $N_2$, etc.) and some fuel which become entrained increasing the normalized jet mass.

Figure 5:
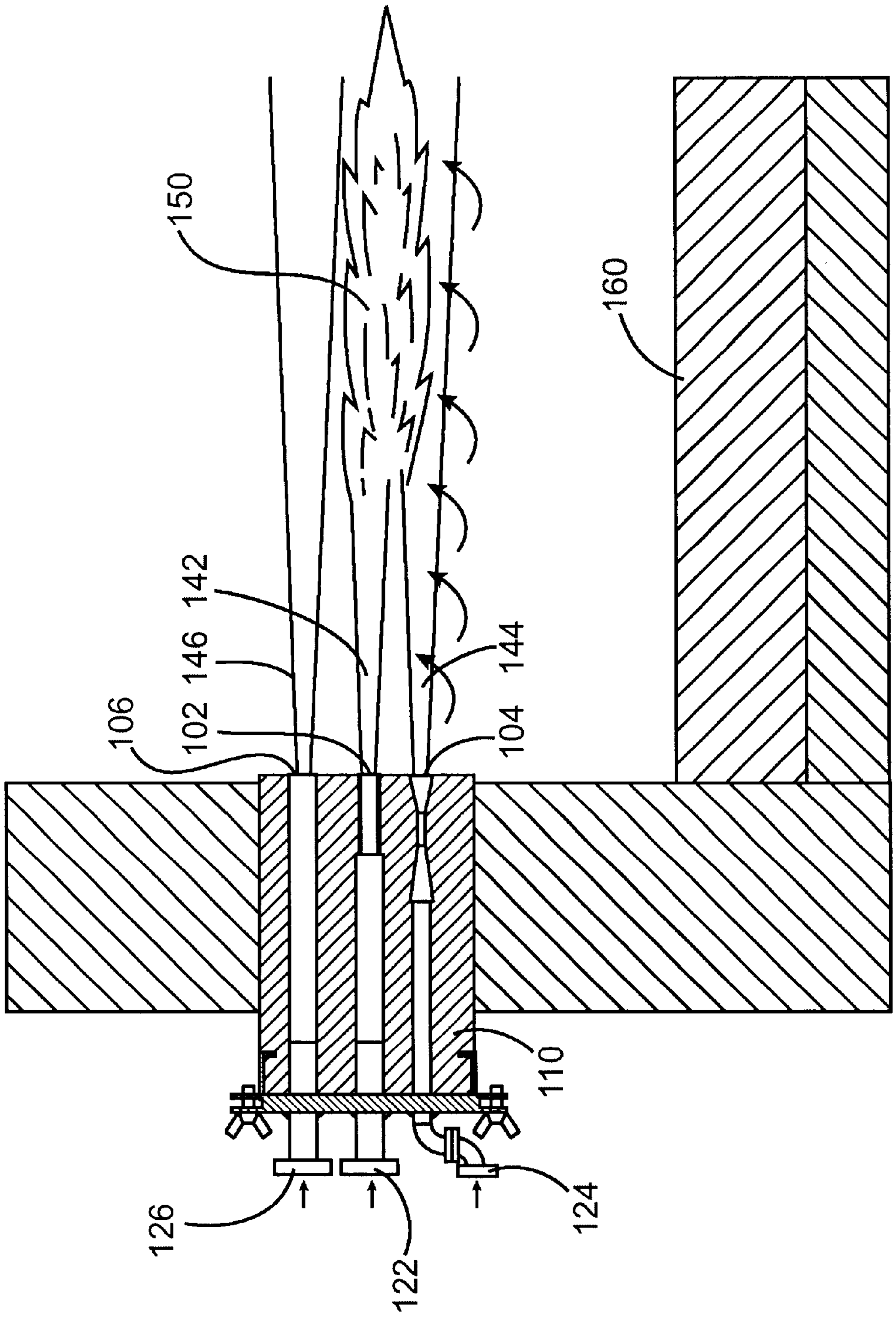
FIG. 5 is a side cross sectional view of the oxy-fuel burner block of FIG. 4 positioned in a furnace.

This principle is applied in the burner 100 of the present invention primarily by the primary oxygen jet 144 as shown in FIG. 5. The primary oxygen jet 144, operated at supersonic velocities, will have the ability to entrain both furnace gases and fuel. By properly adjusting the gap between the primary oxygen nozzle 104 and the fuel nozzle 102, the intensity of the fuel entrainment can be controlled. If the gap between fuel and primary oxidant nozzle 104 is near zero the maximum fuel entrainment will be achieved. This will result in a stable well mixed hot luminous flame. However, by increasing the distance between the fuel nozzle 102 and the oxidant nozzle 104, less fuel and more furnace gases will be entrained into the oxygen stream. The increased entrainment of furnaces gases rich in carbon dioxide, water, and some nitrogen will have the effect of diluting the oxygen stream 144. The subsequent combustion of the fuel jet 142 with this oxygen stream 144 (diluted with furnace gas entrainment) will result in a soft luminous flame similar to an air combustion flame with the benefit of low NOX formation due the low nitrogen content (no direct air involvement).

As shown in FIG. 5, the supersonic oxygen jet 144 issued from a converging-diverging nozzle 130 entrains a large portion of furnace gases in its core. The mixing of the fuel jet 142 with the primary oxygen jet 144 is achieved by entrainment in contrast to direct mixing as proposed by previous flat flame and pipe in pipe burners. As shown in FIG. 5, the fuel is slowly entrained in small eddies and vortices. These vortices mix with the boundary of the primary oxygen jet 144 in a gradual manner. The centerline distance 13 between the primary oxygen nozzle 104 and the fuel nozzle 102 is carefully selected to create interfacial mixing in contrast to bulk mixing. The interface of the primary oxygen jet is diluted with furnace gases and thus oxy-fuel combustion is taking place in a diluted oxygen stream and not a pure oxygen stream. The diluted combustion produces a much cooler flame and lower NOx emissions. In addition, the gradual mixing allows a much longer soot-rich flame due to thermal cracking of fuel into soot particles. The combustion of soot produces a very luminous flame suitable for radiative heat transfer in the visible wavelength (0.5 to 1.5 $\mu$m) range. The secondary oxidant (preferably air or low purity oxygen) is injected above the oxy-fuel flame using multiple horizontal jets. The separation distance 12 between the fuel nozzle 102 and the secondary oxidant nozzles 106 provides a delayed combustion flame. Due to the relatively higher mass of the secondary oxidant (particularly using air) the secondary oxidant provides a fluid dynamic shield over the oxy-fuel flame 150 that pushes the flame down over the glass surface 160. Due to lower overall flame temperatures, the NOx formation is low. Thus, low purity oxygen or air can be selected as the secondary oxidant. The role of the secondary oxidant is to complete the combustion process downstream and provide sufficient oxidant for carbon monoxide burnout.

The amounts of furnace gas entrained by the primary oxygen jet 144 (at subsonic to supersonic velocity) have significance for NOx formation. Suppression of thermal NOx formation, according to the Zeldovich mechanism, depends primarily on achieving a higher overall dilution with cooled products of combustion before the reaction begins with the fuel jet 142. The relative spacing between fuel jet 142 and primary oxygen jet 144 allow for an increased residence time before mixing to occur. In the present invention, the dilution of the primary oxygen jet 144 effectively lowers reaction temperatures and reaction concentrations in the main core of primary flame 150. In addition, the primary flame 150 in the present invention is already at sub-stoichiometric condition (fuel-rich), which automatically operate under lower adiabatic flame temperature. This achieves an adequately high total entrainment of furnace gases by primary flame (due to vigorous high velocity combustion) and produces a relatively cool oxy-fuel flame along with a lower rate of NOx formation in the primary flame core.

In the oxy-fuel burner configuration illustrated in FIG. 5, a dilution of the primary oxygen jet 144 in the range of about 5 to about 10 times the primary oxygen flow rate is achieved before oxygen is reacted with the fuel stream 142. The entrainment process is continued at much higher rate (entrainment up to about 100 times the primary oxygen volume) due to combustion of fuel and oxygen that accelerate flame gases. The accelerated flame gases sustain furnace gas entrainment for a much larger distance than a cold jet. The entrainment mechanism is a feeding mechanism that derives its energy from burning of fuel, increase in flame speed and temperature and propulsion of gases. The entrainment reaches a peak value when most of the fuel is combusted and the flame speeds begin to decline. At this point in time, the flame is already diluted with furnace gases and starts losing momentum due to its own weight.

In the proposed burner the use of oxy-fuel combustion for entrainment of furnace gases and the use of staged combustion with secondary oxidant (air or low purity oxygen) allow maximum entrainment efficiency. Due to higher flame speeds for the oxy-fuel flame of the present invention which is about 10 times higher than for air-gas combustion, the entrainment efficiency is much higher. The resulting oxy-fuel flame (at substoichiometric conditions) powered by a supersonic jet has a much lower flame temperature at a given cross section than an air-fuel flame. The flame diluted with furnace gases also delays fuel combustion and thus produces a much longer flame length.

In the present invention, with the separate injection design of fuel and oxidant, the fuels can be preheated using the waste heat discarded up the flue. By recovering the waste heat from the flue gases the oxidant and the fuel can be preheated.

One example of a nozzle arrangement for a total power of 4 MW has following dimensions:

Primary oxygen: 20 psig to 100 psig pressure drop and the nozzle diameter of 0.5 inches.

Secondary oxidant (low purity oxygen) delivered through 3 nozzles: 0.1 psig pressure drop and nozzle diameter of 1.25 inches diameter.

Natural gas: 1 psig pressure drop and nozzle diameter of 1.25 inches.

While the invention has been described in detail with reference to the preferred embodiments thereof, it will be apparent to one skilled in the art that various changes and modifications can be made and equivalents employed, without departing from the present invention.

What is claimed is:

1. An oxy-fuel burner for producing a long, luminous flame, the burner comprising:

a fuel conduit having a nozzle end;

a primary oxidant conduit having a nozzle end positioned below the fuel conduit;

a secondary oxidant conduit having a nozzle end positioned above the fuel conduit;

a primary oxidant delivery system for delivering the primary oxidant to the primary oxidant conduit at a pressure which causes the primary oxidant to exit the primary oxidant nozzle end at a supersonic velocity; and a secondary oxidant delivery system for delivering the secondary oxidant to the secondary oxidant conduit at a pressure which causes the secondary oxidant to exit the second oxidant nozzle end at less than a supersonic velocity.

2. The burner of claim 1, wherein the primary oxidant exits the primary oxidant nozzle end at about 300 m/s to about 500 m/s.

3. The burner of claim 2, wherein the secondary oxidant exits the secondary oxidant nozzle end at less than about 100 m/s.

4. The burner of claim 2, wherein the fuel exits the fuel nozzle end at about 50 m/s to about 200 m/s.

5. The burner of claim 1, wherein the primary oxidant delivery system delivers about 20 percent to about 50 percent of the oxygen required for stoichiometric combustion.

6. The burner of claim 1, wherein the secondary oxidant delivery system delivers about 50 percent to about 80 percent of the oxygen required for stoichiometric combustion.

7. The burner of claim 1, wherein the fuel conduit, the primary oxidant conduit, and the secondary oxygen conduit are configured to inject the fuel and oxidants in substantially horizontal parallel jets.

8. The burner of claim 1, wherein the secondary oxidant is air.

9. The burner of claim 1, wherein the secondary oxidant is delivered through a plurality of secondary oxidant nozzles.

10. The burner of claim 1, wherein the primary oxidant conduit includes a converging-diverging nozzle at the nozzle end.

11. The burner of claim 1, wherein the primary and secondary oxidant delivery systems are configured to deliver the primary and secondary oxidants at variable velocities which allow the flame characteristics to be varied according to the needs of a particular furnace.

12. An oxy-fuel burner for producing a long, luminous flame, the burner comprising:

a fuel conduit having a nozzle end;

a primary oxidant conduit having a nozzle end positioned below the fuel conduit;

a secondary oxidant conduit having a nozzle end positioned above the fuel conduit;

a fuel delivery system for delivering the fuel to the fuel conduit at a pressure which causes the fuel to exit the fuel nozzle end at a first velocity;

a primary oxidant delivery system for delivering the primary oxidant to the primary oxidant conduit at a pressure which causes the primary oxidant to exit the primary oxidant nozzle end at a second velocity;

a secondary oxidant delivery system for delivering the secondary oxidant to the secondary oxidant conduit at a pressure which causes the secondary oxidant to exit the second oxidant nozzle end at a third velocity, wherein the second velocity is greater than the first and third velocities.

13. The burner of claim 12, wherein the second velocity is a supersonic velocity.

14. The burner of claim 13, wherein the second velocity is about 300 m/s to about 500 m/s.

15. A method of generating a flame suitable for float glass furnaces, the method comprising:

injecting a fuel through a centrally located nozzle in a refractory burner block;

injecting a primary oxidant at supersonic velocity below the fuel; and injecting a secondary oxidant above the fuel nozzle at a lower velocity than the primary oxidant.

16. The method of claim 15, wherein the primary oxidant is injected at about 300 m/s to about 500 m/s.

17. The method of claim 15, wherein the primary oxidant is at least 30% oxygen and the secondary oxidant is less than 30% oxygen.

18. The method of claim 15, wherein the secondary oxidant is injected at less than about 100 m/s.

19. The method of claim 15, wherein the fuel is injected at about 50 m/s to about 200 m/s.

20. The method of claim 15, wherein the injection of the primary oxidant supplies about 20% to about 50% of the oxygen required for stoichiometric combustion.

21. The method of claim 15, wherein the fuel, primary oxidant, and secondary oxidant are injected substantially horizontally.

22. A method of generating a long, luminous flame, the method comprising:

injecting a fuel through a centrally located nozzle in a refractory burner block;

injecting a primary oxidant containing at least 50% oxygen below the fuel at a first velocity; and injecting a secondary oxidant containing less than 30% oxygen above the fuel at a second velocity which is less than the first velocity.

23. The method of claim 22, wherein the primary oxidant is injected at about 300 m/s to about 500 m/s.

24. The method of claim 22, wherein the secondary oxidant is injected at less than about 100 m/s.

25. The method of claim 22, wherein the fuel is injected at about 50 m/s to about 200 m/s.

26. The method of claim 22, wherein the injection of the primary oxidant supplies about 20% to about 50% of the oxygen required for stoichiometric combustion.

* * * * *

UNITED STATES PATENT AND TRADEMARK OFFICE

CERTIFICATE OF CORRECTION

PATENT NO. : 6,659,762 B2
DATED : September 17, 2001
INVENTOR(S) : Harley A. Borders et al.

It is certified that error appears in the above-identified patent and that said Letters Patent is hereby corrected as shown below:

Column 9,
Line 2, please replace the word "second" with the word -- secondary --.
Line 21, please replace the word "oxygen" with the word -- oxidant --.

Column 10,
Line 2, please replace the word "second" with the word -- secondary --.

Signed and Sealed this

Twentieth Day of July, 2004

JON W. DUDAS
*Acting Director of the United States Patent and Trademark Office*